(12) United States Patent
Kurian et al.

(10) Patent No.: US 8,097,687 B2
(45) Date of Patent: *Jan. 17, 2012

(54) MULTIFUNCTIONAL AZO INITIATORS FOR FREE RADICAL POLYMERIZATIONS: USES THEREOF

(75) Inventors: Pious V. Kurian, Aurora, IL (US);
Anoop Chengara, Aurora, IL (US);
Jeffery M. Atkins, Aurora, IL (US)

(73) Assignee: Nalco Company, Naperville, IL (US)

( * ) Notice: Subject to any disclaimer, the term of this patent is extended or adjusted under 35 U.S.C. 154(b) by 381 days.

This patent is subject to a terminal disclaimer.

(21) Appl. No.: 12/367,998

(22) Filed: Feb. 9, 2009

(65) Prior Publication Data

US 2010/0204362 A1   Aug. 12, 2010

(51) Int. Cl.
*C08F 4/30* (2006.01)
*C08F 4/36* (2006.01)
*C08F 2/00* (2006.01)
(52) U.S. Cl. ............ 526/229.5; 526/232.3; 526/236
(58) Field of Classification Search ............ 526/229.5, 526/232.3, 236
See application file for complete search history.

(56) References Cited

U.S. PATENT DOCUMENTS

| | | | |
|---|---|---|---|
| 4,532,301 A | 7/1985 | Dean | |
| 4,929,721 A | 5/1990 | Wolf et al. | |
| 6,433,092 B2 * | 8/2002 | Krupinski et al. | 525/192 |
| 6,605,674 B1 | 8/2003 | Whipple et al. | |
| 6,627,719 B2 | 9/2003 | Whipple et al. | |
| 6,753,388 B1 | 6/2004 | Whipple et al. | |
| 2010/0204361 A1 * | 8/2010 | Kurian et al. | 523/336 |

FOREIGN PATENT DOCUMENTS

WO   WO 00/68275   11/2000

OTHER PUBLICATIONS

Prog. Polym. Sci., Vol. 12, -109, 1986, *Progress in the field of Bi-and Poly-Functional Free-Radical Polymerization Initiators*, Cr. I. Simionescu E. ComănităM. Păstrăvanu and S. Dumitiu.
Romanian Chemical Quarterly Reviews 1995 3 (2), 83-103.
Synthesis 2006 (4), 680-686, *Sodium Borohydride as the Only Reagent for the Efficient Reductive Alkylation of Malononitrile with Ketones and Aldehydes*, Jason C. Dunham, Adam D. Richardson and Robert E. Sammelson.
Synthesis 2005 (4), 543-546, *A Convenient and Selective One-Pot Method for the Synthesis of Monosubstituted Secondary Alkyl Malonnitriles*, Robert E. Sammelson and Mark J. Allen.
Polymer Bulletin 57, 157-167 (2006), *Experimental Study of a Tetrafunctional Peroxide Inhibitor: Bulk Free Radical Polymerization of Butyl Acrylate and Vinyl Acetate*, Matthew J. Scorah, Renato Cosentino, Ramdhane Dhib, Alexander Penlidis.
Macromol. Chem. Phys. 2003, 204, 436-442, *Free Radical Polymerization of Styrene with a New Tetrafunctional Peroxide Initiator*, Sabile Fityani-Trimm, Ramdhane Dhib, Alexander Penlidis.

* cited by examiner

*Primary Examiner* — Nathan M Nutter
(74) *Attorney, Agent, or Firm* — Benjamin E. Carlsen; Michael B. Martin

(57) ABSTRACT

The invention provides compositions of matter, methods of their synthesis, and methods of their use in polymerization reactions. The compositions include polyfunctional initiators used to make star polymers when polymerized with monomers. The polyfunctional initiators are synthesized out of a multifunctional core with at least two functional groups and two or more initiator units bonded to the functional groups. The initiator units have two electron-withdrawing groups bonded to a central carbon atom and an azo group between the central carbon atom and the functional group. The polyfunctional initiators are particularly effective because when they decompose to form the radical core of a star polymer, the electron-withdrawing groups prevent the corresponding radical from forming any linear polymer contamination and only desired star polymers result. In addition when the desired star polymers are fed into a reaction vessel by streams with two different concentrations the star polymers produce superior properties.

10 Claims, 9 Drawing Sheets

MULTIFUNCTIONAL AZO INITIATORS FOR FREE RADICAL POLYMERIZATIONS: USES THEREOF

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

The present invention relates to synthesis of thermolabile multifunctional azo compounds and their use for the preparation of high molecular weight well-defined structured polymers. As described for example in U.S. Pat. Nos. 6,605,674, 6,627,719, and 6,753,388 these azo compounds are particularly useful for the synthesis of flocculants, coagulants and dispersants for paper, mining and wastewater industries.

Well-defined macromolecular architectures are typically prepared by living anionic or cationic polymerization or by controlled radical polymerizations such as RAFT (Reversible addition-fragmentation chain transfer), ATRP (Atom Transfer Radical Polymerization), NMP (Nitroxide-Mediated Polymerization) and more recently SET-LRP (Single Electron Transfer-Living Radical Polymerization). Each of these methods have limitations, such as monomer compatibility, purity of reactants, reaction medium, heavy metal contamination in the final product, longer reaction times, and an inability to achieve high molecular weights. From an industrial point of view these polymerizations are not enticing due to the processing cost and selectivity towards monomers and reaction conditions. Traditional free radical polymerization is widely used industrially for polymer synthesis, due to the ease of synthesis and the ability to avoid the limitations of the prior methods. However, the ability to control the concise architecture of the final product using traditional free radical methods is limited.

There are many ways to manipulate the architecture of macromolecules. Star polymers gained much attention in the last two decades and there have been numerous publications on its synthesis and properties of the resulting polymers. The two most common ways to make star polymers are (1) start with a multifunctional initiator (as shown in FIG. 1) and (2) covalently attach a preformed polymer to a polyfunctional core. Polyfunctional initiators result in polymers of high molecular weights and in the synthesis of very large macromolecules (MW several millions) the first route is the preferred method of preparation.

Synthesis of linear macromolecules from azo initiators are widely known and have been practiced for many years. AIBN (Azobisisobutyronitrile) is one of the most commonly used initiator molecule in the industry and academia due to its cost, availability, solubility and decomposition temperature. Upon decomposition a molecule such as AIBN generates a molecule of $N_2$ and two equally reactive radicals capable of initiating polymerization, which could lead to two linear polymers. There are numerous publications available on the manipulation of azo groups to gain better control on the final architecture of the macromolecule. Several detailed reviews on azoderivatives are available in the literature; especially reviews by C. I. Simionescu et al. covers most of the work done in this area. (Prog. Polym. Sci., 1986, 12, 1-109; Romanian chemical quarterly reviews 1995; 3(2), 83-103).

There are very few useful multifunctional initiators capable of initiating polymerization. The main drawback with multifunctional initiators is that upon decomposition, a second radical produces linear polymers in addition to the desired star polymers. For example, (as illustrated in FIG. 3) a prior art composition commercially known as Arkema's Luperox JWEB50 is a multifunctional (four functional) organic peroxide, which upon decomposition yields a tetra functional initiator and four tertbutoxy radicals which each could produce linear polymers. (Penlidis et at,: Poly Bull 2006, 57, 157-167 and Penlidis et al.: Macromol Chem Phys 2003, 204, 436-442). In order to exclusively make structured polymer these tertbutoxy radicals need to be prevented from initiating polymerization reactions.

U.S. Pat. No. 4,929,721 teaches the preparation of azo side groups on the polymer backbone by copolymerization. The azo groups on the resulting polymer may be used for post modification of the polymer. The azo groups reported by this patent have two main problems; first, the decomposition temperature of this molecule is too high to be practically used as a polymerization initiator for inverse emulsion polymerization. Their objective was to keep this molecule stable during polymerization and activate only for post modification. This patent reports their compounds to be very stable at 130° C. The second problem with this approach is that this will also create the linear polymers in addition to graft co-polymers.

International Patent Application WO/0224773 teaches the synthesis of branched polymers. In this teaching they have taken into account of the fact there could be linear polymers formed. This was eliminated by making sure the second radical is unable to initiate the polymerization. However, this teaching also fails to make well-defined cores to make well-defined star polymers. Both of the above teachings makes use of the vinyl groups to homo or co-polymerize the azo groups onto a polymer and the azo groups are activated at a later time for further modification of the polymer or at the same time to make highly random branches. Activation of the azo side groups at the same time as the backbone synthesis will lead to highly branched but a poorly defined architecture. This approach in flocculant synthesis will result in highly closed architecture, which are known to be very ineffective.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. §1.56(a) exists.

BRIEF SUMMARY OF THE INVENTION

At least one embodiment is directed towards a polyfunctional initiator comprising a multifunctional core bonded to at least two initiator units. Each initiator unit comprises two electron-withdrawing groups bonded to a central carbon atom and an azo group between the central carbon atom and the multifunctional core.

At least one embodiment is directed to a polyfunctional initiator in which the multifunctional core comprises at least two end atoms. Each end atom is bonded to an initiator unit. The atom of each end atom is selected from the list consisting of oxygen, carbon, and nitrogen. The multifunctional core spans at least one string with a string length of between 2 and 100 atoms between each end atom not including the end atoms. The atoms within the string are selected from the list consisting of oxygen, carbon, and nitrogen.

At least one embodiment is directed to a polyfunctional initiator in which the multifunctional core further comprises between 1 and 4 branching atoms. Each branching atom is an atom within at least three different strings. Each branching atom is engaged at all of its binding sites to other atoms within a string and is selected from the list consisting of carbon and nitrogen.

One architecture of the polyfunctional initiator is according to Formula I:

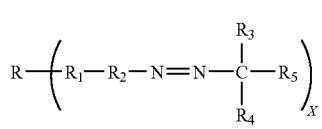

Formula I wherein:
R is a multifunctional core with at least two functional groups, $R_1$ is a linker group selected from the list consisting of: an amide whose carbonyl group is attached to nitrogen and is attached to $R_2$ by the nitrogen; an ester whose carbonyl group is attached to oxygen and is attached to the $R_2$ by the nitrogen; and an ether group in which the oxygen is attached to $R_2$, $R_2$ is a hydrocarbon having between 4 and 20 carbon atoms. At least one of $R_3$ and $R_4$ are an electron-withdrawing group. One of $R_3$ and $R_4$ can be an electron donating group. $R_5$ is hydrocarbon having between 1 and 50 carbon(s); and X is greater than 1.

The multifunctional core R can be one selected from the list consisting of: 2,2',2"-Nitrilotriethylamine, triethanol amine, pentaerytritol and its derivatives, dendritic molecules, multifunctional amines, multifunctional acid chlorides, multifunctional carbonyls, multifunctional esters, and multifunctional alcohols. $R_1$ can be selected from the list consisting of: two or more alkyl groups, two or more aryl groups, and alkyl and an aryl group as well as a linear substituted alkyl group, a non-linear substituted alkyl group, a linear unsubstituted alkyl group, a non-linear unsubstituted alkyl group, a linear substituted aryl group, a non-linear substituted aryl group, a linear unsubstituted aryl group, a non-linear unsubstituted aryl group, a linear substituted cyclo alkyl group, a non-linear substituted cyclo alkyl group, a linear unsubstituted cyclo alkyl group, and a nonlinear unsubstituted cyclo alkyl group.

In at least one embodiment, at least one of the electron withdrawing groups are selected from the list consisting of CN, $CONR_6R_7$ and $COOR_8$ wherein: $R_6$, $R_7$, and $R_8$ are each one selected from the list consisting of hydrogen, a linear alkyl group, a linear aryl group, a linear alkoxy group, a linear amino group, a linear alkylamino group, a linear hydroxyl group, a branched alkyl group, a branched aryl group, a branched alkoxy group, a branched amino group, a branched alkylamino group, and a branched hydroxyl group. In addition, $R_5$ can be selected from the list consisting of: a linear alkyl group, a non-linear alkyl group, an aryl alkyl group, a non-linear aryl group, and any combination thereof.

At least one embodiment is directed towards a method of synthesizing a polyfunctional initiator comprising the steps of: synthesizing two or more initiator units; synthesizing one or more multifunctional cores each having more than one functional group; and coupling each functional group to an initiator unit. In at least one embodiment the initiator units comprise two electron-withdrawing groups bonded to a central carbon atom and an azo group between the central carbon atom and the multifunctional core. The step of synthesizing two or more initiator units further comprises the steps of: diazotization of an aryl amine; reacting the diazotized aryl amine with an alkyl malonitrile to form an aromatic diazo compound; and converting the carboxylic acid into an acid chloride. In at least one embodiment the aryl amine is formed from reacting 3-Aminobenzoic acid with sodium nitrite to form a diazonium ion.

In some embodiments the alkyl malonitrile is isopropyl malonitrile. In some embodiments the acid is converted into an acid chloride using $PCl_5$, the halide is chlorine and the synthesis further comprises the step of: replacing the bond connecting the halide atom to the acid with a bond connecting the functional group to the acid, and the functional group is an alcohol, an amine, or a sulfur based group.

At least one embodiment is directed towards a method of synthesizing a polymer comprising the steps of: providing at least one polyfunctional initiator comprising a multifunctional core bonded to at least two initiator units wherein each initiator unit comprises two electron-withdrawing groups bonded to a central carbon atom and an azo group between the central carbon atom and the multifunctional core, providing a plurality of monomers, and reacting the at least one polyfunctional initiator and plurality of monomers in a radical polymerization reaction.

BRIEF DESCRIPTION OF THE DRAWINGS

A detailed description of the invention is hereafter described with specific reference being made to the drawings in which.

DETAILED DESCRIPTION OF THE INVENTION

For purposes of this application the definition of these terms is as follows:

"Architecture" means the sequential arrangement of constituent groups of a polymer, which results in the degree to which a polymer is linear, branched, structured, starred, or any combination thereof.

"Branching Atom" means an atom within two or more strings that is bonded to more than two atoms counted in a string.

"Floc" means a mass formed in a fluid through precipitation or aggregation of suspended particles.

"Initiator" means a composition of matter that initiates a radical polymerization reaction upon thermal decomposition.

"Initiator Unit" means that portion of a polyfunctional initiator that is bound to the multifunctional core and is capable of initiating a radical polymerization reaction upon thermal decomposition.

"Hindrance Group" means a group that sterically impairs the ability of a monomer to react with a radical.

"Multifunctional" means having two or more arms or arm supporting regions.

"3-Functional Initiator" means an initiator having 3 arms.
"4-Functional Initiator" means an initiator having 4 arms.
"5-Functional Initiator" means an initiator having 5 arms.
"6-Functional Initiator" means an initiator having 6 arms.
"N-Functional Initiator" means an initiator having a number of arms equal to the integer N.

"Multifunctional Core" means a structural portion of a polyfunctional initiator bound to or capable of binding to two or more initiators. The multifunctional core comprises two or more functional groups and each functional group can bind one initiator to the core.

Figure 3:
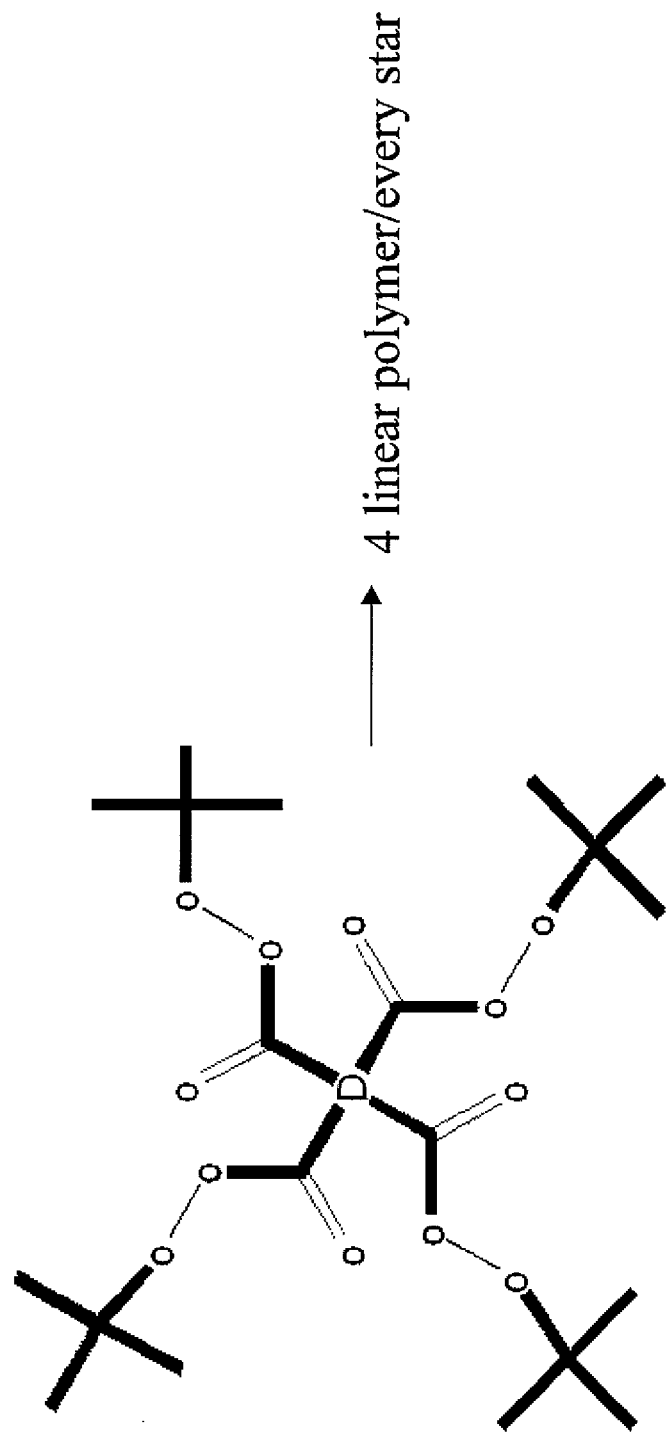
FIG. 3 is an illustration of a PRIOR ART star initiator.

"4-Functional Peroxide Initiator" means an initiator having 4 arms according to the structure illustrated in FIG. 3 where D represents one or more atoms. Luperox Jweb50 by Arkema is an example of a 4-Functional Peroxide Initiator.

"Polyfunctional Initiator" means a composition of matter containing two or more sites capable of initiating a radical polymerization reaction after thermal decomposition, which then anchor a repeating polymer chain. A polyfunctional initiator comprises at least one multifunctional core and two or more initiator units. A polyfunctional initiator may have more than one kind of initiator unit.

"Stable Radical" means a composition of matter having a radical site formed after thermal decomposition, which is substantially incapable of initiating a radical polymerization reaction due to the effects of one or more stabilizing groups in the composition of matter.

"String" means the smallest set of consecutive interconnected atoms (not including hydrogen) between two points on a molecule or between two points on a portion of a molecule, and does not include branched deviations from that set. The "string" between end atom A and end atom Z (which does not include A and Z in the count) in the following molecule has a length of 6:

Any atom within a string can be in more than one string, so branching atom B is within 4 strings (AZ, AM, JZ and JM).

"String Length" means the number of atoms in a string.

"Second Structuring Agent" means a structuring agent other than an initiator.

"Structuring Agent" means a composition of matter, which facilitates the interconnection of linear polymers to form structured polymers.

"Structured Polymer" means a polymer comprising two or more linear chains with two or more cross linkages interconnecting the linear chains.

In the event that a description of a term stated elsewhere in this application is inconsistent with a meaning (explicit or implicit) which is commonly used, in a dictionary, or stated in a source incorporated by reference into this application, the application and the claim terms in particular are understood to be construed according to the description stated in this application, and not according to the common definition, dictionary definition, or the definition that was incorporated by reference.

Figure 1:
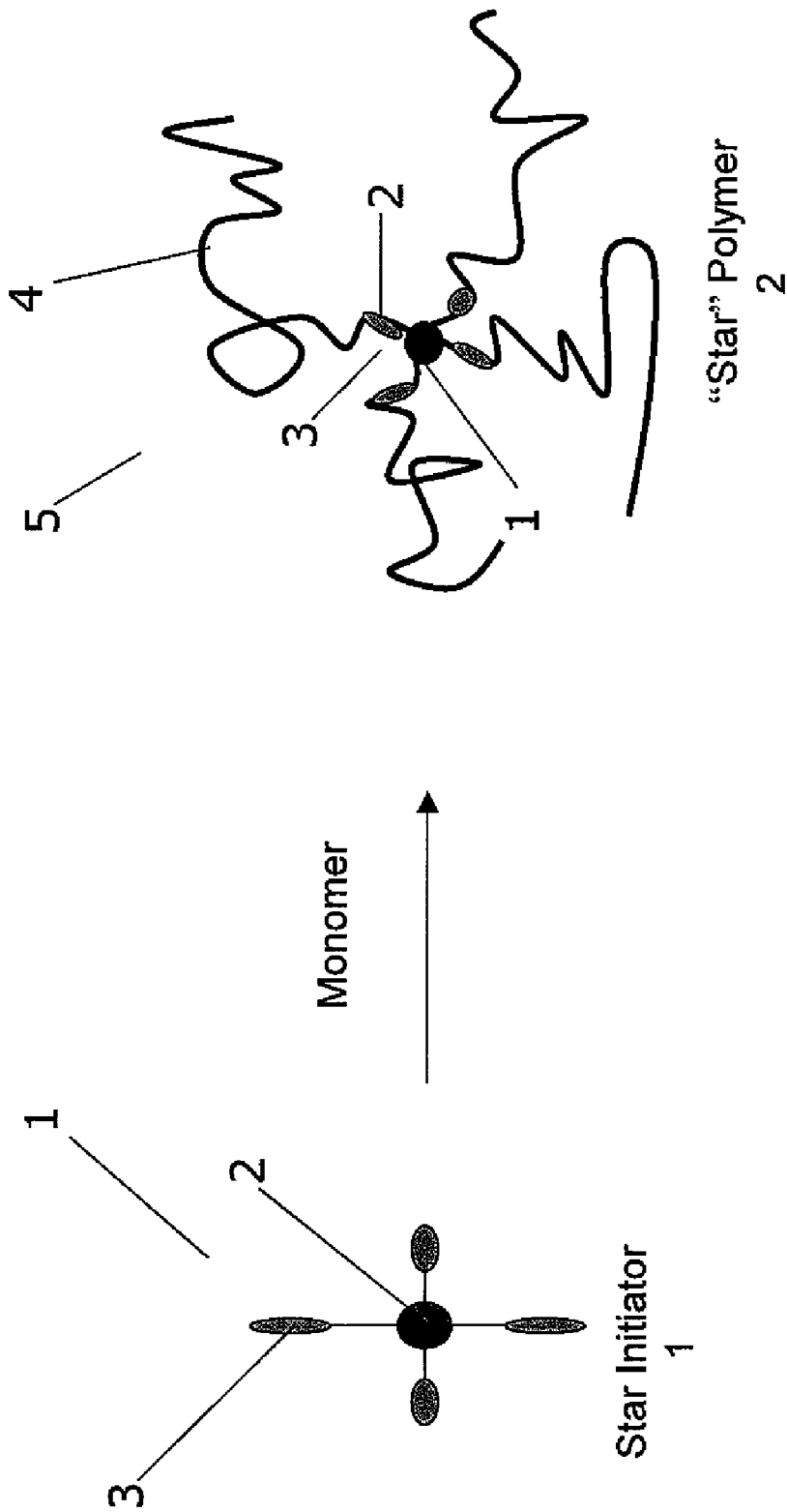
FIG. 1 is an illustration of the synthesis of a star polymer.

Referring now to FIG. 1 there is shown a 4-Functional Initiator star initiator (1) comprising a multifunctional core (2) bound to 4 initiator units (3). When polymerized with monomer units a repeating chain (4) becomes anchored at each initiator unit (3). A star polymer (5) results from the extension of a repeating chain (4) being bound to multiple initiator units (3). Some examples of methods of preparing star initiators are found in the co-pending, commonly owned, simultaneously filed application titled "Novel Multifunctional Azo Initiators for Free Radical Polymerizations: Methods of Preparation" having an attorney docket number of 8110.

Embodiments of the present invention relate to the synthesis of novel multifunctional azo initiators and the polymerization of structured polymers and copolymers of high molecular weight from these initiators. Embodiments of the invention are directed towards structured polymers obtained from radical polymerizations using initiators according to formula I:

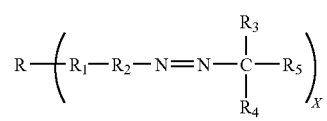

Formula I

Wherein R is a multifunctional core such as, 2,2',2"-Nitrilotriethylamine, triethanol amine, pentaerythritol and its derivatives, or dendritic molecules with multiple functional groups. The number of arms of the resulting polymer depends on the number of functional group present in the core. The most common core groups are multifunctional amines, acid chlorides or alcohols.

$R_1$ is a linker group such as an amide, an ester, or an ether group. In at least one embodiment $R_1$ is an amide group having one or more carbon atoms, the endmost carbon atom being part of a carbonyl group attached to a nitrogen atom. $R_1$ is engaged by one of the one or more carbon atoms to R. $R_1$ is engaged to $R_2$ by the nitrogen atom. In at least one embodiment, $R_1$ is positioned within the initiator according to the following formula where $R_X$ represents a carbon bearing group:

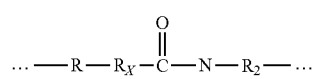

In at least one embodiment $R_1$ is an ester group having one or more carbon atoms, the endmost carbon atom being part of a carbonyl group single bonded to an oxygen atom. $R_1$ is engaged by one of the one or more carbon atoms to R. $R_1$ is engaged to $R_2$ by the single bonded oxygen atom. In at least one embodiment, $R_1$ is positioned within the initiator according to the following formula where $R_X$ represents a carbon bearing group:

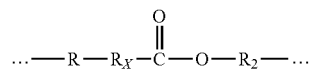

In at least one embodiment $R_1$ is an ether group having one or more carbon atoms, the endmost carbon atom being attached to an oxygen atom. $R_1$ is engaged by one of the one or more carbon atoms to R. $R_1$ is engaged to $R_2$ by the oxygen atom. In at least one embodiment, $R_1$ is positioned within the initiator according to the following formula where $R_X$ represents 1 or more carbon atoms:

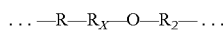

$R_2$ represent linear and non-linear, substituted or non-substituted alkyl, aryl or cyclo-alkyl having 4 to 20 C atoms. $R_3$ and $R_4$ can be same or different. At least one of $R_3$ and $R_4$ are electron withdrawing groups including but not limited to CN, $CONR_6R_7$ or $COOR_8$ wherein $R_6$, $R_7$, and $R_8$ are individually similar or dissimilar, and represent hydrogen, or a linear or branched alkyl, aryl group, alkoxy, amino, alkylamino, or hydroxyl groups or similar groups. One of $R_3$ and $R_4$ can be an electron depositing group. $R_5$ represents linear or structured alkyl or aryl groups having 1 to 50 carbons and X is greater than or equal to 2.

Figure 2:
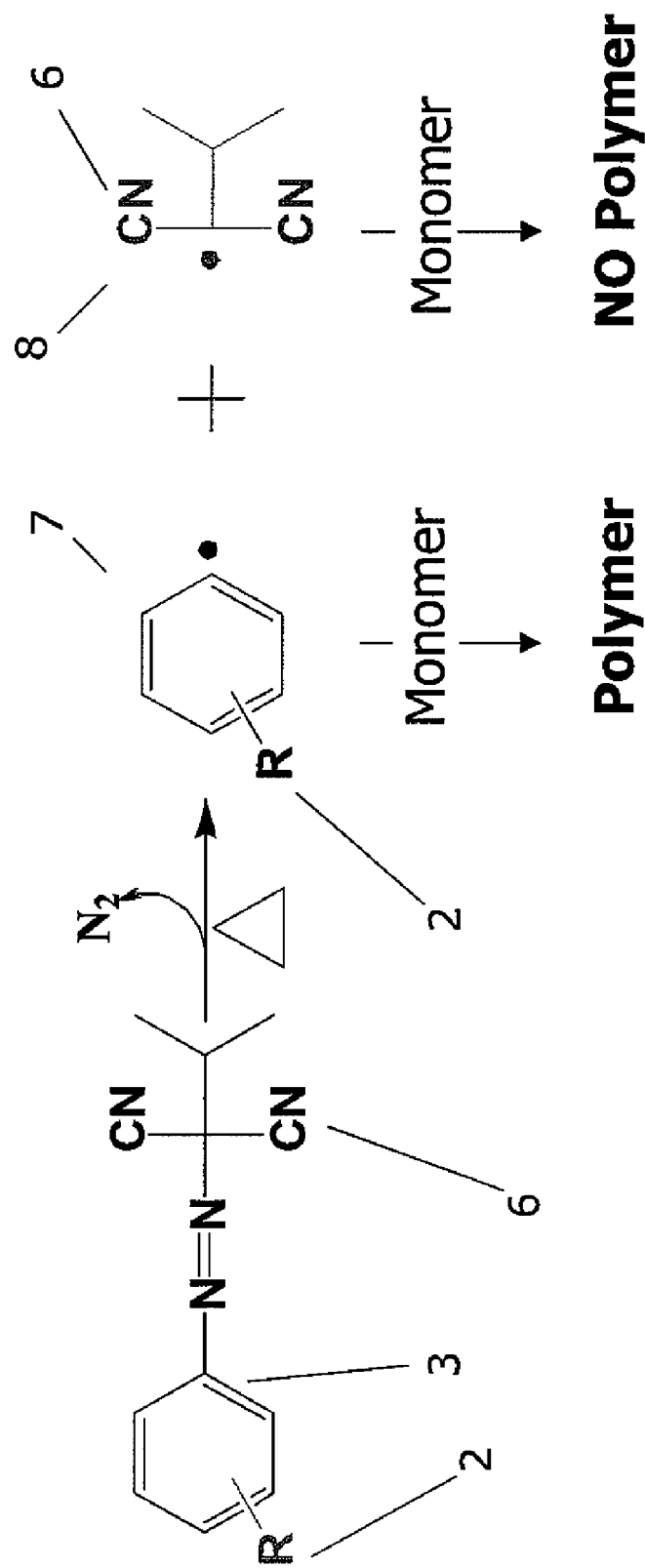
FIG. 2 is an illustration of the decomposition of a star initiator.

As illustrated in FIG. 2, when the initiator (3) is heated it can thermally decompose, releasing a $N_2$ molecule and two radical containing units (7, 8). One of the units (8) contains functional groups (6) capable of stabilizing the radical-containing species, preventing it from initiating a polymerization reaction. The second radical containing unit (7) receives no such stabilization, and is capable of initiating a polymerization reaction in a monomer solution. As that unit (7) containing the active radical species is bound to a multifunctional core, polymerization is only initiated from units bound to the multifunctional core. As the multifunctional core contains two or more initiators, and upon thermal decomposition the only active radical species that could be formed are bound to the multifunctional core, the resultant polymer will be a star polymer.

In at least one embodiment, one or more of the stabilizing groups (6) are electron-withdrawing groups, which reduce the reactivity of the stable radical (8). The electron withdrawing groups can be engaged to a central atom. If the central atom is a carbon, there can be 1-3 electron-withdrawing groups. In at least one embodiment, an electron-withdrawing group is selected from the list consisting of CN, $CONR_6R_7$, $COOR_8$, COOH, $NO_2$, and $CF_3$. In at least one embodiment, the electron-withdrawing group comprises an aryl group engaged to the central atom and one item selected from the same list engaged to the aryl group.

In at least one embodiment, one or more of the stabilizing groups (6) are large steric hindrance groups. A steric hindrance group is a bulky group that either covers the radical site of the stable radical, or sufficiently blocks monomer access to the radical site thereby preventing the radical from reacting with monomers to form linear polymers. In at least one embodiment, the steric hindrance group can be selected from the list of: linear, branched, aromatic, aliphatic groups, and any combination thereof that include between 4 and 100 carbon atoms. The steric hindrance group can comprise carbon, silicon, oxygen, sulfur, and any combination thereof.

In at least one embodiment, the multifunctional core comprises at least one string extending between two end atoms. Each end atom is bonded to an initiator unit. When the multifunctional core thermally decomposes, the initiator radical remains engaged to the end atom while the stable radical is detached. The string comprises atoms selected form the list consisting of oxygen, nitrogen, carbon, sulfur, silicon, and any combination thereof. The string atoms may be in the form of siloxane, carbonyl, amine (primary, secondary, and tertiary) groups, and may themselves be engaged to other groups as well. The string may span from 2 to 100 atoms between each end atom not including the end atoms. In at least one embodiment, the end atom is bonded to a nitrogen atom that will become part of the generated $N_2$ molecule when the initiator decomposes.

In embodiments in which the multifunctional core comprises more than two initiator units, the string also comprises branching atoms. The branching atoms are bonded to three or more non-hydrogen atoms, and lie along more than one string. When there is more than one initiator, for each initiator unit there is at least one string extending between end atoms. The branching atoms can be saturated or unsaturated. The multifunctional core may comprise chains of atoms that are not strings extending between initiator units. Multifunctional cores may have each string run through a single branching atom, or there may be branching atoms which branch off from other branching atoms thereby having branching atoms through which not every string passes. Branching atoms may comprise any atom capable of bonding three or more other atoms. The end atoms may be nitrogen, oxygen, silicon, carbon, or any atom capable of bonding two other atoms.

The following examples are presented to describe embodiments and utilities of the invention and are not meant to limit the invention unless otherwise stated in the claims.

EXAMPLES

1) Initiator Synthesis

In at least one embodiment, the initiator unit was synthesized from various components. Initiators having 2, 3, 4, 5, 6, and any number of initiator units are contemplated by this invention. The number of initiator units on each initiator depends on the multifunctional core that the initiator is formed with.

In one embodiment, the multifunctional azo initiator was formed using a convergent synthetic route, in which the initiator unit was synthesized, and then coupled to a multifunctional core. 3-(Azoisopropyl-malonitrile)benzoic acid was formed in yields greater than 95% through the diazotization of an aryl amine. 3-Aminobenzoic acid was treated with sodium nitrite to form a diazonium ion, which was then reacted with isopropyl malonitrile in the presence of sodium acetate to form the unsymmetrical azo initiator. Isopropylmalonitrile was synthesized via literature methods. (Dunham, J. C.; Richardson, A. D.; Sammelson, R. E., Synthesis 2006, (4), 680-686, Sammelson, R. E.; Allen, M. J. Synthesis 2005, (4), 543-546).

In at least one embodiment, the multifunctional azo initiator is formed by first converting the acid into the acid chloride using $PCl_5$. 3-(Azoisopropylmalonitrile)benzoyl chloride readily forms esters or amides when reacted with alcohols or amines under standard reaction conditions.

2) 3-(Azoisopropylmalonitrile)benzoic acid

Concentrated HCl (96.4 g) was slowly added to a solution of 100.4 g of 3-aminobenzoic acid (3-ABA) in 1.98 L of $H_2O$ in a 5 L reactor, fitted with a mechanical stirrer and a thermometer, and stirred until the 3-ABA was dissolved. The solution was cooled to 3° C. on an ice bath, and then a chilled solution of 50.5 g of $NaNO_2$ in 410 mL $H_2O$ was added quickly. The temperature of the reaction mix rose to 7° C., and a white precipitate began to form. After 15 minutes, a chilled solution of 87.0 g of isopropylmalonitrile, 78.0 g of sodium acetate in 710 mL of EtOH and 600 mL of $H_2O$ are added to the reaction mix. A slight temperature rise (5-10° C.) was observed again. A thick yellow solid precipitated from the solution within 5 minutes. After 45 minutes, the product was filtered off, washed with a small amount of chilled $H_2O$, and dried for 72 hours under vacuum to give 183.1 g (98%) of 3-((isopropylmalonitrile)diazo)-benzoic acid. The structure was confirmed by $^{13}C$ NMR and $^1H$ NMR.

3) 3-(Azoisopropylmalonitrile)benzoyl chloride 43.5 g of $PCl_5$ was added to a cooled solution (4° C., ice bath) of 50 g of 3-((isopropylmalonitrile)diazo)benzoic acid in 600 mL of $CH_2Cl_2$. The temperature rose slightly to 10° C. The mix was allowed to stir for 2 hours at 4° C., then another 2 hours at room temperature. The solution was concentrated 50%, and 300 mL of hexanes was added. The precipitate was removed from the mix by filtration, and the solution was concentrated to dryness to give 51.16 g of a dark brown oil (95%) of the acid chloride, which was used without any other further purification. The structure was confirmed by $^{13}C$ NMR and $^1H$ NMR.

4) 3-Arm Star Initiator

A cooled solution containing 1.34 g of $NEt_3$ and 0.59 g of tris(2-aminoethyl)amine in 30 mL of $CH_2Cl_2$ was added to a solution of 3.30 g of 3-((isopropylmalonitrile)diazo)benzoyl chloride in 50 mL of $CH_2Cl_2$ at 3° C. under an $N_2$ atmosphere. The mix was stirred for 3 hours, and then quenched with 60 mL of brine. The aqueous layer was separated and washed twice with 30 mL of $CH_2Cl_2$. The combined organic layers was dried with $Na_2SO_4$, filtered, and concentrated under vacuum to give 3.29 g of a yellow solid. The structure was confirmed by $^{13}C$ NMR and $^1H$ NMR.

5A) Inverse Emulsion Polymerization

Preparation of Acrylamide/Dimethylaminoethyl Acrylate Methyl chloride Quaternary Salt (50/50) copolymers.

An aqueous monomer phase was made up dissolving 9.82 g Adipic acid (Sigma-Aldrich, St. Louis, Mo.) and 34.78 g DI water in 227.74 g of 49.5% aqueous solution of Acrylamide (Nalco Company, Naperville, Ill.). The components were stirred until a homogenous solution was formed. To this solution added 0.1 g of EDTA followed by 384.084 g Dimethylaminoethyl acrylate methylchloride (DMAEA-MCQ, SNF Riceboro, Ga.) and mixed well. An oil phase was prepared from 274.96 g of hydrocarbon solvent (Exxon Chemical Company, Houston, Tex.), 14.1 g Arlacel 80AC (Uniqema, New Castle, Del.) and 16.3 g Tween 85 (Uniqema, New Castle, Del.) at room temperature. Oil phase was added to a 1500 mL reactor set at 40° C. When oil phase addition was complete rate of mixing was increased from 500 rpm to 1000 rpm and added the monomer phase slowly into the oil phase. The mixing was accomplished by a 10 mm rod with a Teflon paddle at the base and 6-blade turbine mounted 3-inches from the bottom. The resulting emulsion was mixed for next 30 minutes. At 30 minutes the multifunctional azo initiator was added and started to purge the reaction with nitrogen (about 1 L/min). The initiator molecule (0.40 to 0.012 g) was charged as a solution in DMF, or as powder into the emulsion or it was semi batched over 2-4 hrs. Polymerization was started at 40° C. and during the reaction the temperature was increase to 70° C. At the end of the polymerization the reaction held at 70° C. for one hour and cooled to room temperature. A polymer solution was made up by mixing 2.0 g of water-in-oil emulsion and 198 g water with 0.12 g of nonionic surfactant alcohol ethoxylate (Clariant Basel, Switzerland), in a 300 ml tall beaker for 30 minutes with vigorous mixing. An RSV of 19.2 dl/g (1M $NaNO_3$, 450 ppm, 30° C.) was measured for the polymer.

5B) Inverse Emulsion Polymerization of Acrylamide/Dimethylaminoethyl acrylate methyl chloride Quaternary Salt Copolymers Using Multifunctional Initiator and Other Structuring Agents Such as MBA or HEMA An aqueous monomer phase was made up dissolving 9.82 g Adipic acid (Sigma-Aldrich, St. Louis, Mo.) and 34.78 g DI water in 227.74 g of 49.5% aqueous solution of Acrylamide (Nalco Company, Naperville, Ill.). The components were stirred until a homogenous solution was formed. To this solution added 0.1 g of EDTA followed by 384.084 g Dimethylaminoethyl acrylate methylchloride (DMAEA-MCQ, SNF Riceboro, Ga.), followed by 2-5 g of 2-hydroxyethyl acrylate and/or 0.1 to 10 g of 1% methylene bisacrylamide and mixed well. An oil phase was prepared from 274.96 g of hydrocarbon solvent (Exxon Chemical Company, Houston, Tex.), 14.1 g Arlacel 80AC (Uniqema, New Castle, Del.) and 16.3 g Tween 85 (Uniqema, New Castle, Del.) at room temperature. Oil phase was added to a 1500 mL reactor set at 40° C. When oil phase addition was complete rate of mixing was increased from 500 rpm to 1000 rpm and added the monomer phase slowly into the oil phase. The mixing was accomplished by a 10 mm rod with a Teflon paddle at the base and 6-blade turbine mounted 3-inches from the bottom. The resulting emulsion was mixed for next 30 minutes. At 30 minutes the multifunctional azo initiator was added and started to purge the reaction with nitrogen (about 1 L/min). The initiator molecule (0.40 to 0.012 g) was charged as a solution in DMF, or as powder into the emulsion or it was semi batched over 2-4 hrs. Polymerization was started at 40° C. and during the reaction the temperature was increase to 70° C. At the end of the polymerization the reaction held at 70° C. for one hour and cooled to room temperature. A polymer solution was made up by mixing 2.0 g of water-in-oil emulsion and 198 g water with 0.12 g of nonionic surfactant alcohol ethoxylate (Clariant Basel, Switzerland), in a 300 ml tall beaker for 30 minutes with vigorous mixing. An RSV of 10.8 dl/g (1M $NaNO_3$, 450 ppm, 30° C.) was measured for the polymer. Reactions were also conducted with methylene bisacrylamide (but at much lower concentrations compared to 2-hydroxyethyl acrylate) to obtain similar results.

5C) Inverse Emulsion Polymerization of Acrylamide/Dimethylaminoethyl acrylate methyl chloride Quaternary Salt Copolymers Using 4 Functional Peroxide Initiator An aqueous monomer phase was made up dissolving 9.82 g Adipic acid (Sigma-Aldrich, St. Louis, Mo.) and 34.78 g DI water in 227.74 g of 49.5% aqueous solution of Acrylamide (Nalco Company, Naperville, Ill.). The components were stirred until a homogenous solution was formed. To this solution added 0.1 g of EDTA followed by 384.084 g Dimethylaminoethyl acrylate methylchloride (DMAEA-MCQ, SNF Riceboro, Ga.) and mixed well. An oil phase was prepared from 274.96 g of hydrocarbon solvent (Exxon Chemical Company, Houston, Tex.), 14.1 g Arlacel 80AC (Uniqema, New Castle, Del.) and 16.3 g Tween 85 (Uniqema, New Castle, Del.) at room temperature. Oil phase was added to a 1500 mL reactor set at 50° C. When oil phase addition was complete rate of mixing was increased from 500 rpm to 1000 rpm and added the monomer phase slowly into the oil phase. The mixing was accomplished by a 10 mm rod with a Teflon paddle at the base and 6-blade turbine mounted 3-inches from the bottom. The resulting emulsion was mixed for next 30 minutes. At 30 minutes depending on the reaction 0.25 to 1.0 g of 4-functional peroxide (Arkema's Luperox® Jweb50) initiator was added and started to purge the reaction with nitrogen (about 1 L/min). Polymerization was started at 50° C. and during the reaction the temperature was increase to 70° C. At the end of the polymerization the reaction held at 70° C. for one hour and cooled to room temperature. A polymer solution was made up by mixing 2.0 g of water-in-oil emulsion and 198 g water with 0.12 g of nonionic surfactant alcohol ethoxylate (Clariant Basel, Switzerland), in a 300 ml tall beaker for 30 minutes with vigorous mixing. An RSV of 15.4 dl/g (1M $NaNO_3$, 450 ppm, 30° C.) was measured for the polymer.

Flocculation Performance of Copolymers

The effectiveness of various star polymers was demonstrated by a free drainage test, which compared their flocculation and dewatering performance. The polymer is activated by inverting it at a concentration of typically 2200 mg/L on an actives basis in DI water under vigorous stirring using a cage stirrer at 800 rpm for 30 minutes. 200 mL of sludge sample is conditioned with a specified volume of the polymer solution in a 500 mL cylinder by manually inverting the cylinder a specified number of times, usually 5, 10 or 20 depending on the amount of shear to be simulated. Since the polymer dose is varied, a specified volume of dilution water is added to the sludge prior to conditioning so that the total volume of water added via the polymer and the dilution water is constant, usually 25 mL. The conditioned sludge is filtered under gravity through a constant area of a belt press fabric, usually either 41 cm$^2$ or 85 cm$^2$. The filtrate mass is measured as a function of time via an electronic balance. The mass of the filtrate at a specified time is plotted against polymer dosage for various polymers.

Figure 4:
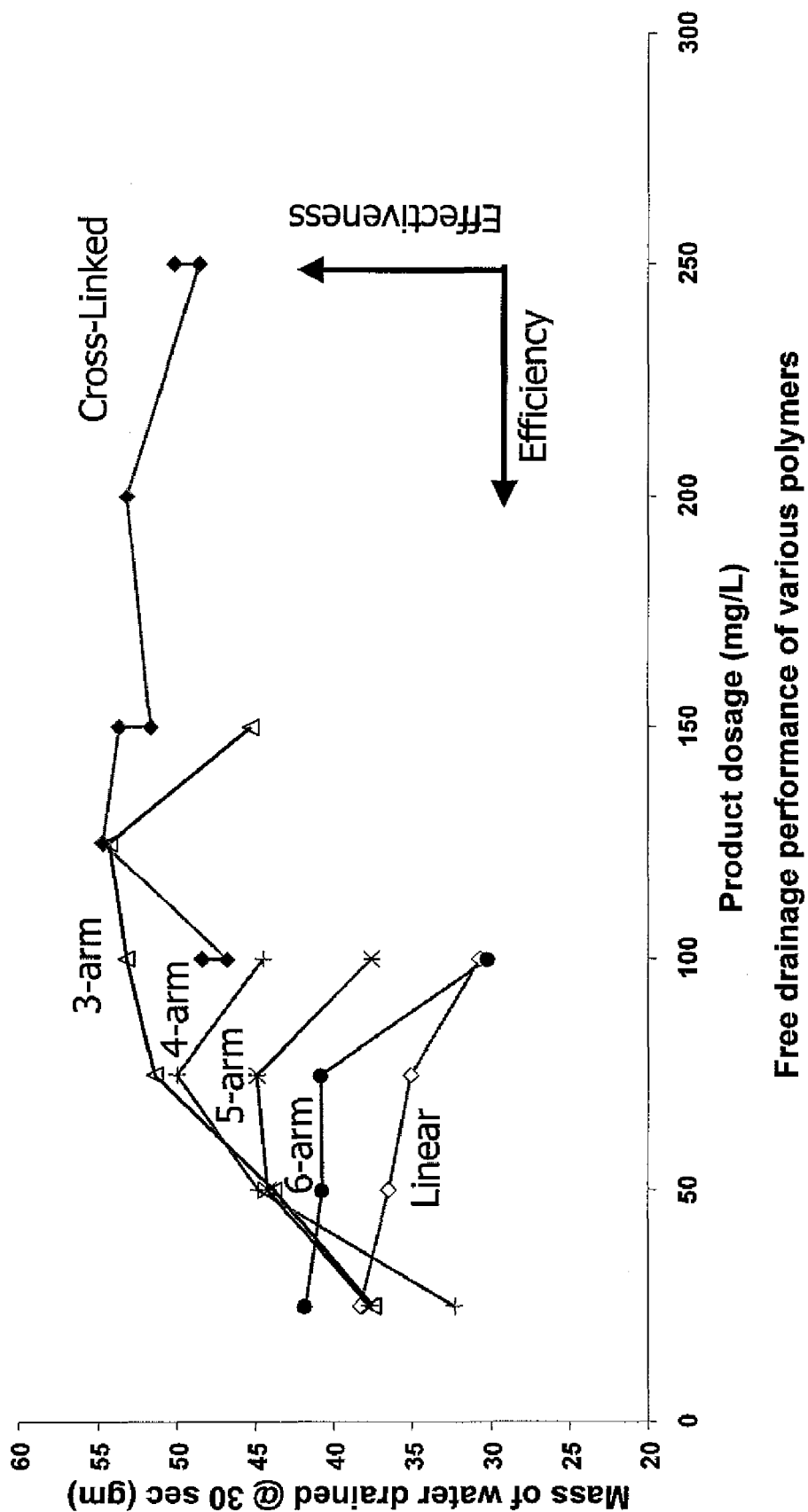
FIG. 4 is a graph illustrating star polymer performances.

FIG. 4 illustrates the performance advantages of these new molecules at 30 seconds of drainage in the dewatering of sludge from a chemical industry. An ideal polymer would show high drainage (high effectiveness) preferably occurring at low polymer dosage (high efficiency). A prior art linear polymer shows very low filtrate mass over a wide range of polymer dosage i.e. poor effectiveness. Increasing the polymer dosage further, reduces the drainage because of the so called "overdose effect". In the "overdose effect" increasing the dosage of polymer beyond its optimum value causes it to remain on the exterior of the floc aggregates which then adhere to the filtration fabric and blind it. Secondly, the excess polymer also increases the viscosity of the filtrate, both of which contribute to a reduced drainage rate.

A prior art cross-linked polymer is effective (it drains higher amounts of water) but it is inefficient because it yields these results only at high dosages. The cross-linked polymer also has a relatively level slope in the region of optimum dosage, indicating an absence of the overdose effect. 6-arm, 5-arm, 4-arm, and 3-arm polymers all show better effectiveness than the linear polymer and are more efficient than the cross-linked polymer because they function at lower dosages. The 3-arm polymer in particular matches the best effectiveness of the cross linked polymer, but at dosages less than that of the cross-linked polymer, indicating its superior efficiency.

Figure 5:
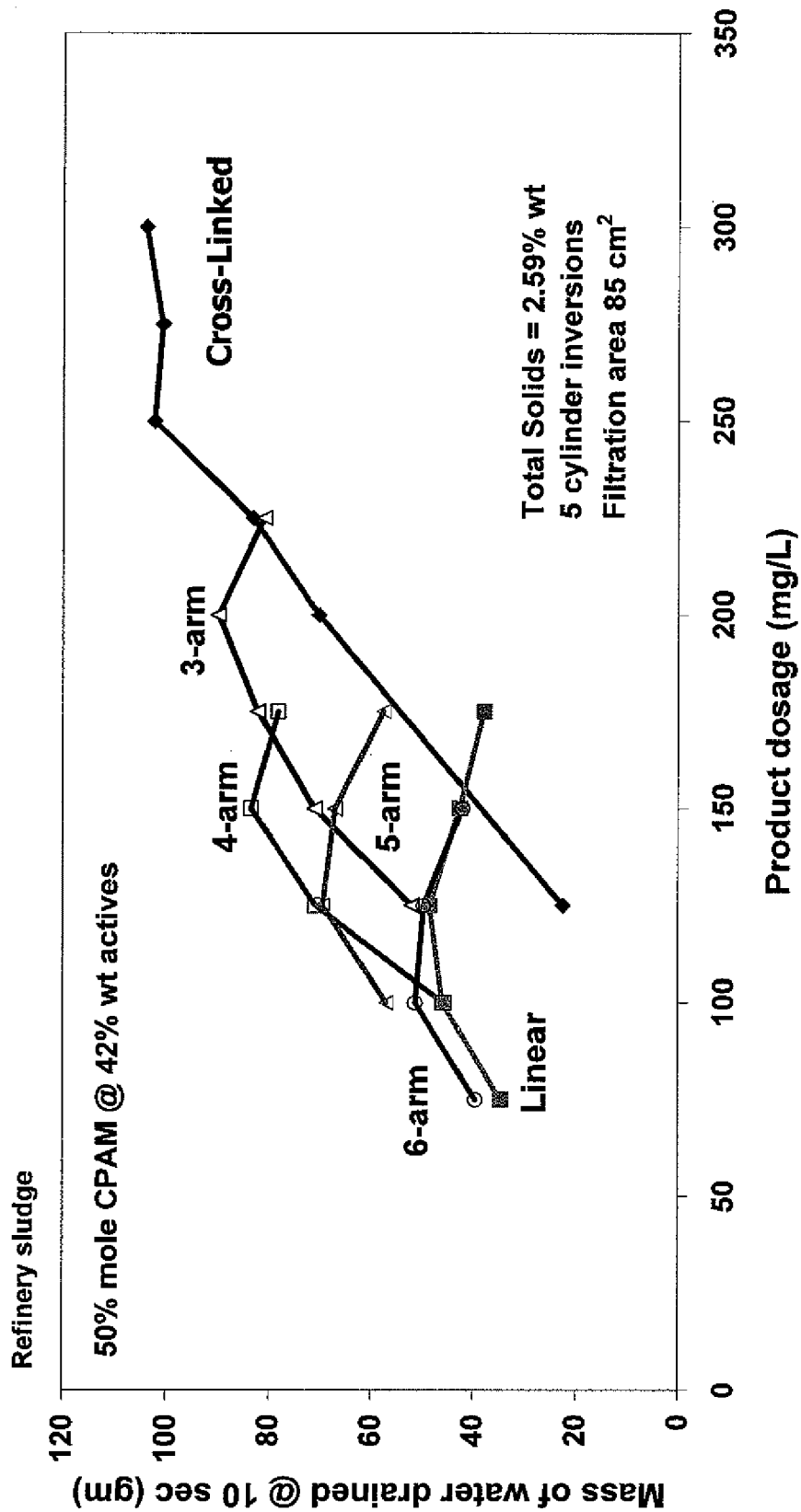
FIG. 5 is a graph illustrating star polymer performances.

FIG. 5 illustrates the effectiveness and efficiency of star polymers relative to cross-linked and linear polymers at 10 seconds of drainage when applied to the dewatering of sludge from a refinery. It shows that 3-arm, 4-arm polymers are nearly as effective at achieving high drainage and much more efficient in polymer dosage compared to the cross-linked polymer. The 3-arm, 4-arm and 5-arm star polymers are much more effective at achieving high drainage than the linear polymer. In at least one embodiment, the star polymer is itself treated by cross linking agents to form an even more structured star polymer having at least one cross linkage between at least two star polymer arms in addition to the multifunctional core. These even more structured star polymers have enhanced dewatering properties.

Figure 6:
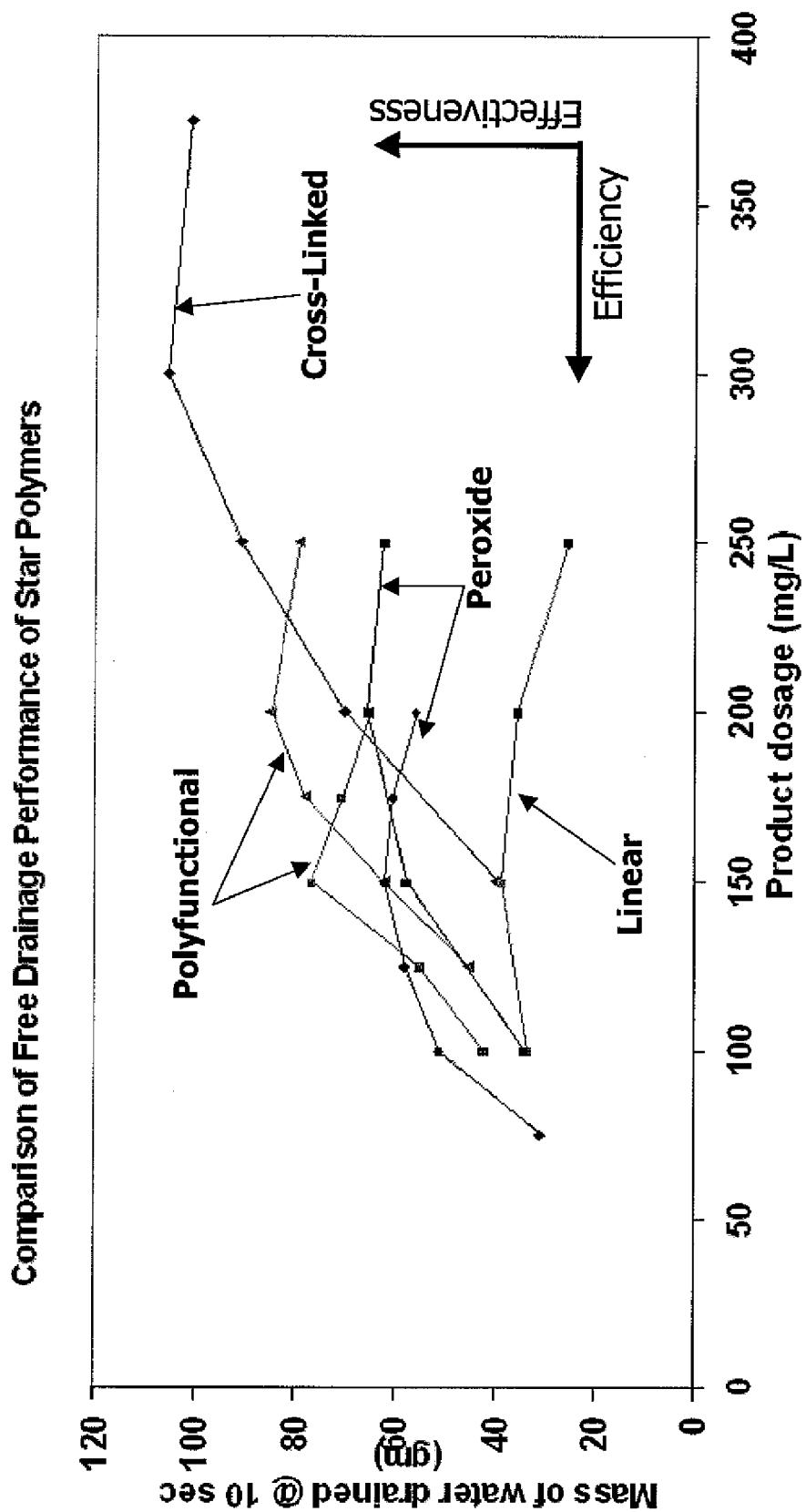
FIG. 6 is a graph illustrating star polymer performances.

FIG. 6 shows performance advantage of the polymers made using these novel initiators (labeled "Polyfunctional") compared with prior art cross-linked, linear polymers, and peroxide initiator based polymers. The results show that the 3-arm, 4-arm star polymers made from the novel initiators perform more effectively than the prior art linear polymer and the multifunctional peroxide initiator based polymer, and are more efficient than the cross-linked polymer, with only marginal decrease in effectiveness.

The superior performance of star polymers arises from their unique solution viscosity properties. The viscosity of a star polymer is high at a high solution concentration e.g. 0.5% wt product in water, but decreases sharply at lower concentration e.g. below 0.3% wt product. In contrast, the viscosity of a linear polymer is not as high as that of the star polymer at high concentration and decreases gradually with decrease in solution concentration of the polymer. A cross-linked polymer shows a very low viscosity that is nearly independent of concentration in the concentration range of 0.5% wt to 0.05% wt. In the initial stage of flocculation, the high viscosity star polymer solution forms large floc aggregates of the primary particles in the sludge suspension. Upon further mixing of the star polymer solution and the sludge suspension, the floc aggregates become more compact and dense compared to the case of a linear polymer solution, since its decreasing solution viscosity allows faster rearrangement of polymer molecules within the floc aggregate. This compact floc architecture releases more free water, resulting in faster drainage, compared to the flocs obtained from conditioning with a linear polymer. A cross-linked polymer solution will also provide a compact floc architecture giving high drainage rates, but due to its low viscosity, will form small flocs each containing a smaller number of primary particles. Therefore, to flocculate all particles of a suspension, a larger polymer dosage of the cross-linked polymer is required, making it less efficient. A star polymer combines the low dosage benefit of the linear polymer and the high drainage benefit of the cross-linked polymer, making it a superior product.

In at least one embodiment the performance of one or more polymers can be enhanced, by dosing the same quantity of polymer as a mixture of solutions with different polymer concentrations. The different polymer concentrations have more than one viscosity. Dosing the polymer in solutions of two different viscosities increases drainage effectiveness compared to dosing it as a solution of one concentration (and hence viscosity). The high viscosity solution forms large and compact floc aggregates as described above. At polymer dosages above the optimum value, the "overdose effect" described previously is mitigated by the low viscosity solution, because it is easily incorporated into the floc aggregate, producing dense, non-sticky flocs.

Figure 7:
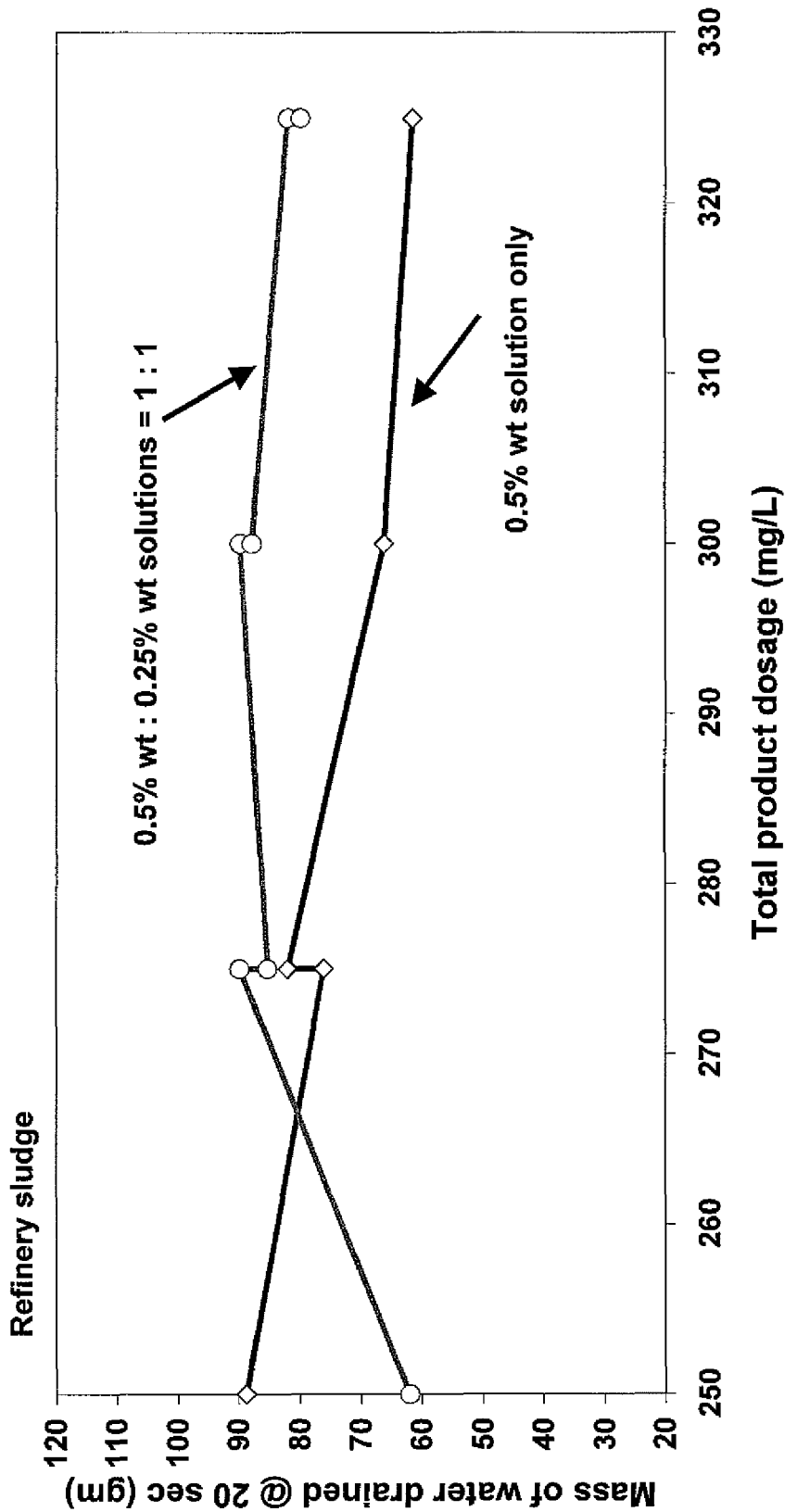
FIG. 7 is a graph illustrating dual feed polymer performances.

In at least one embodiment represented by FIG. 7, the performance of a star polymer is improved by this dual dosing process. The dual dosing process is even more effective with star polymers than with linear polymers because the difference in viscosity with concentration is more pronounced in star polymers.

FIG. 7 specifically illustrates the results of an experiment demonstrating the dual dosing process with a 4-arm star polymer on a sludge sample from a refinery. In this experiment, a fixed quantity of polymer was fed as an equal combination of 0.5% wt solution and a 0.25% wt solution on a product basis. Both polymer solutions were injected into the sludge sample at the same time and mixed with the sludge for the same number of inversions as the base case of 0.5% wt solution alone. Thus, there was no confounding effect of different energies of mixing or the improved drainage that is known to occur from a sequential feed of polymer. With increasing dosage, the proportion of the 0.25% wt solution to the 0.5% wt solution increased, since the need was to avoid more of the high viscosity solution (i.e. 0.5% wt solution) at excessive dosages. Replicates were run to check reproducibility.

As seen from FIG. 7, there is no decrease in drainage rate at excessive dosages when the dual concentration solutions are used, in contrast to the decrease in drainage when the high polymer concentration solution is used. This is because any excess polymer is present as a low viscosity solution (in the dilute 0.25% wt form), which is much easier to incorporate into the interior of the floc, making it denser and less sticky on the exterior surface. Thus, there is no fouling of the filtration fabric at excessive dosage. This feeding scheme has the advantage that the operating dosage window of the polymer is now larger and variations in the solids content of the influent sludge can be more easily handled.

Figure 8:
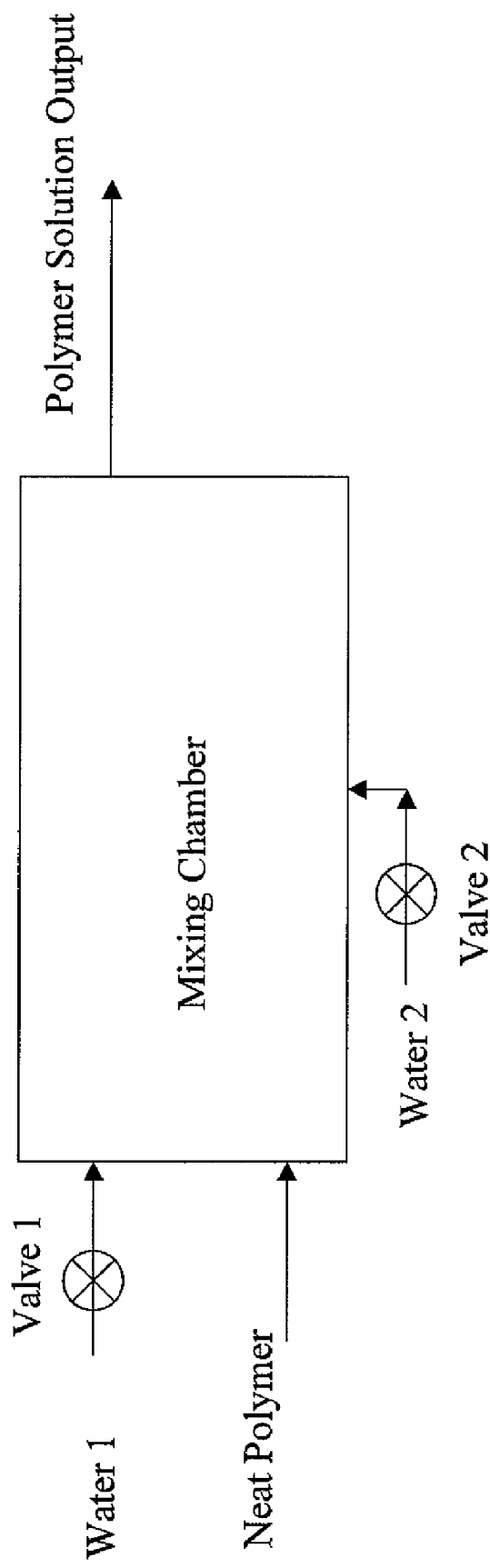
FIG. 8 is an illustration of a PRIOR ART polymer feed apparatus.

Referring now to FIG. 8 there is shown a prior art feeder system commonly used in the industry for activating polymer into solution. The prior art feeder adds neat polymer product (polymer as stored) and water to a mixing chamber to a desired concentration and then outputs the polymer solution at that concentration (Polymer Solution Output). The prior art feeder includes a primary water input (Water 1) and a secondary water input (Water 2), which is an option for further dilution of the polymer solution, as well as a Polymer Solution Output.

Figure 9:
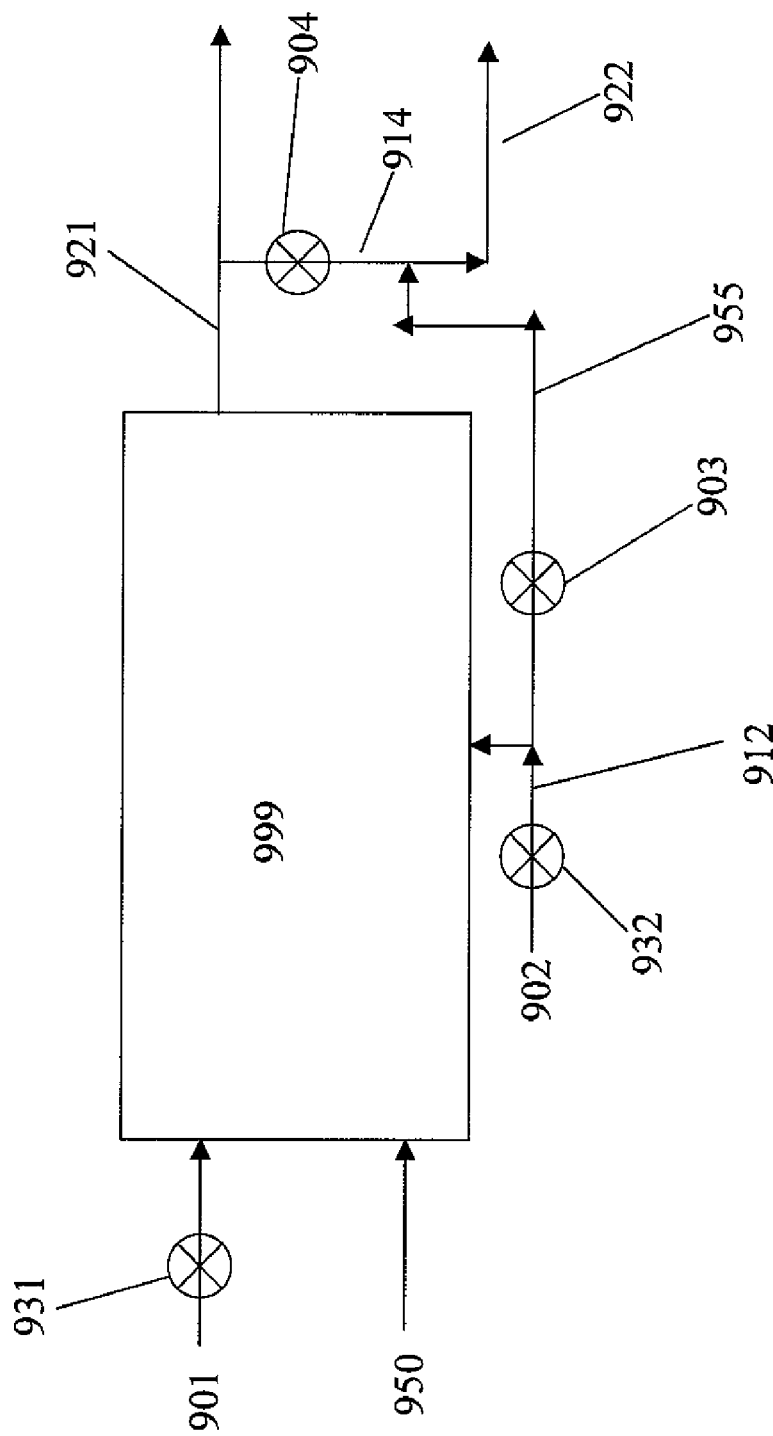
FIG. 9 is an illustration of a dual dosage polymer feed apparatus.

FIG. 9 illustrates a novel cost effective modification to the feeder system, which allows for use of the dual dosing process with existing feeder systems. In addition to a first water input (901) controlled by a first valve (931) in fluidic communication with a mixing chamber (999) this feeder system has a second input pipe (912) extending the supply of secondary water input (902) to a second polymer solution output (922). This second input pipe (912) allows the contents of the first polymer solution output (921) to be further diluted into the second polymer solution output (922). The second input pipe (912) can be controlled by second valve (932).

The flow of water into the second polymer solution output (922) can be controlled by a third valve (903) into a mixing pipe (955), while the fraction of first polymer solution output (921) to be diluted can be controlled by a fourth valve (904) into a fourth pipe (914) which also feeds into the second polymer solution output (922). Using this method and apparatus, a specified fraction of the first polymer solution output (921) can be diluted to a known concentration and fed into the application as the second polymer solution output (922), which is of lower viscosity. The first polymer solution output (921) and the second polymer solution output (922) can either be combined into a single stream via a header just prior to the injection point into the suspension to be flocculated, or can be fed as two different streams. By regulating the third and fourth valves (903 and 904), any combination of high viscosity and low viscosity polymer solutions can be injected into the application for optimum drainage performance. In at least one embodiment, the apparatus comprises a polymer input pipe (950)

While this invention may be embodied in many different forms, there are shown in the drawings and described in detail herein specific preferred embodiments of the invention. The present disclosure is an exemplification of the principles of the invention and is not intended to limit the invention to the particular embodiments illustrated. Furthermore, the invention encompasses any and all possible combinations of some or all of the various embodiments described herein. Any and all patents, patent applications, scientific papers, and other references cited in this application are hereby incorporated by reference in their entirety.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method of synthesizing a star polymer comprising the steps of: providing at least one polyfunctional initiator having a multifunctional core and at least two initiator units, providing a plurality of monomers, decomposing each of the at least two initiator units to form at least one initiator radical and at least one stable radical, and initiating a polymerization reaction between each of the at least one initiator radicals and the plurality of monomers, wherein substantially no polymerization occurs between the stable radical and the monomers, wherein the stable radical comprises at least one stabilizing group, wherein substantially no linear polymers are produced, and wherein the at least one stabilizing group is an electron-withdrawing group bonded to a central carbon atom and an azo group is between the central carbon atom and the multifunctional core.

2. The method of claim 1 wherein at least one stabilizing group comprises a steric hinderance group.

3. The method of claim 1 wherein the polymerization reaction occurs at a temperature of between 40 and 70 degrees centigrade.

4. The method of claim 1 wherein the decomposition involves disconnecting the azo group from the multifunctional core thereby forming the initiator radical and the stable radical, the at least one stabilizing group preventing the stable radical from initiating a polymerization reaction.

5. The method of claim 1 further comprising the step of exposing the polymerization reaction to a structuring agent.

6. The method of claim 5 in which the structuring agent: has at least two polymerizable double bonds, has at least one polymerizable double bond, has at least one functional group reactive with acid monomers or water soluble salts thereof, has at least two functional groups reactive with acid monomers or water soluble salts thereof, is a polyvalent metal compound, and any combination thereof.

7. The method of claim 6 in which the structuring agent is a bis-acrylamide, a di, tri, or polyester of an unsaturated mono or poly carboxylic acid polyol, a di or tri glycidyl ether of a polyol, a multi-substituted ally amine, or any combination thereof.

8. The method of claim 1 in which the polyfunctional initiator is according to Formula I:

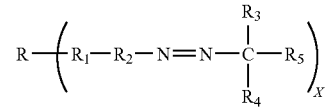

Formula I wherein: R is a multifunctional core with at least two functional groups, $R_1$ is a linker group selected from the list consisting of one or more carbons, an amide, an ester, an amine, and an ether, $R_2$ is a hydrocarbon having between 4 and 20 carbon atoms, $R_3$ and $R_4$ are the electron withdrawing groups, $R_5$ is hydrocarbon having between 1 and 50 carbon(s) or a radical stabilizing group, and X is greater than 1.

9. The method of claim 1 in which the polyfunctional initiator has between 2 and 16 initiator units.

10. The method of claim 1 further comprising the step of providing at least two polyfunctional initiators, at least two of the provided polyfunctional initiators have a different number of initiator units.

* * * * *